March 12, 1940. V. FISCHETT 2,193,586
PROCESS OF MANUFACTURING PLASTIC OBJECTS OF CONTRASTING COLORS
Original Filed March 17, 1937

Vincent Fischett
INVENTOR.
BY
ATTORNEY.

Patented Mar. 12, 1940

2,193,586

UNITED STATES PATENT OFFICE 2,193,586

PROCESS OF MANUFACTURING PLASTIC OBJECTS OF CONTRASTING COLORS

Vincent Fischett, South Ozone Park, N. Y., assignor to National Fabricating Company, South Ozone Park, N. Y.

Application March 17, 1937, Serial No. 131,385
Renewed October 20, 1939

3 Claims. (Cl. 18—61)

The invention relates to the manufacture of plastics and may be applied to plastics of various kinds. It has for its main object to provide a simple and effective way for inlaying, or inserting, insignia, letters, numerals, or decorations of various forms and colors, in other pieces of plastic material.

Another object is to use such combinations of plastics that there will be no danger of the inserts becoming loose, even when the objects in which the inserts are made are put to hard use. A further object is to provide a process of this kind which will lend itself to articles of various kinds and shapes, and which can be performed at a reasonable expenditure of time and labor.

These and various other objects and advantages will be readily understood from the following description and from the accompanying drawing, in which, however, modifications may be made without departing from the scope of the appended claims.

In the drawing, which is submitted for the purpose of more fully explaining the process, Fig. 1 is a top view of a plastic button ready to receive an insert;

Figure 1:
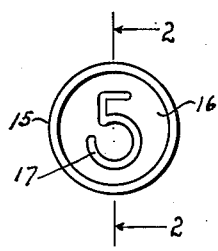
Figure 2:
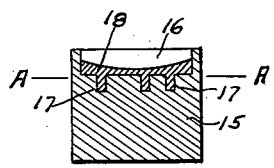
Fig. 2 is a cross-sectional, side view, taken on line 2—2 in Fig. 1, and shown with the plastic mass which will form the insert.
Figure 3:
Fig. 3 is a top view of the finished button.

Reference is first made to Figs. 1, 2 and 3 in which a push button 15 is shown. The process consists in forming a recess 16 in the top face of the button and to end mill, mold, or otherwise form a depressed design 17 in the bottom of the recess, as for example the numeral 5 shown in the present case. A quantity of liquid or semiliquid plastic material 18 is now poured or pressed into the recess 16 and allowed to "cure" or solidify for the required length of time.

This "curing" may either be under atmospheric temperature or under slight artificial heat, according to the nature of the materials used. The essential part of the process is that the plastic material from which the button is made, as well as the plastic material which is poured into the recess, is such that they will firmly adhere to each other. Under ordinary circumstances, I find that the use of the same plastic material for the button and the insert gives the best results, but there are cases in which plastics of different kinds may be employed.

After the plastic mass 18 is thoroughly solidified, the upper part of the button is cut away across the line A—A. This moves the whole recess and the excess mass of the plastic in the recess and leaves a button, as indicated in Fig. 3, in which the inserted numeral "5" is now shown at 19.

It will be seen that in this manner letters, numerals, ornamentations, or insignia of any kind and of contrasting colors may be inserted in the button. It will also be noted that as the inserts have considerable depth, there is no danger of them being worn away, even with excessive usage.

In Figs. 7, 8, 9 and 10, a similar button 20 is shown. In this instant a recess 21 is likewise formed in the top face of the button and a triangle depression 22 is formed in the bottom of the recess. A quantity of plastic material 23 is poured into the recess so as to completely fill the triangle-shaped depression. After this has been thoroughly solidified, a depression 24 is formed in the now cured mass of plastic 23, and in the bottom of this recess another design 25 is depressed. A quantity of plastic material 26 is now poured into this last-mentioned recess and allowed to solidify.

Figure 10:
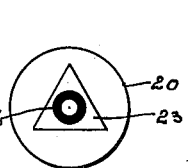
Fig. 10 is a top view of the button finished in accordance with the steps shown in Figs. 7, 8 and 9.

When the top of the button is trimmed off down to the line B—B, the face of the button will appear as shown in Fig. 10. If the button member has been made of material of one color and the two inserts of different colors, it is evident that the result will be a face of three different colors. From this it will be seen that several colors may be thus inlaid or inserted in the button.

Figure 11:
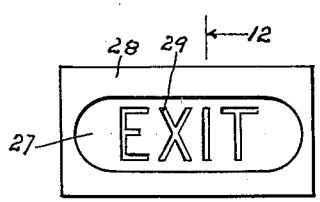
Fig. 11 is a plan view of a sign.
Figure 12:
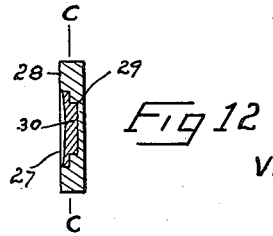
Fig. 12 is a cross-sectional, side view, taken on line 12—12 in Fig. 11, shown with the plastic mass inserted.

In Figs. 11 and 12, the steps of making a sign are illustrated. In this instance a recess 27 is formed in a sheet of plastic material 28 and in the bottom of this recess, the letters 29 of the sign are depressed. If a quantity of plastic material 30 is poured into the recess 27, and the sign trimmed to the lines C—C, a sign with inlaid letters will result.

Figure 4:
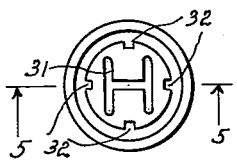
Fig. 4 is a top view of another button shown inserted in a mold.
Figure 5:
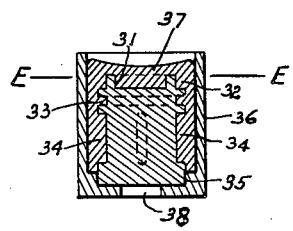
Fig. 5 is a cross-sectional, side view, taken on line 5—5 in Fig. 4, and shown with the plastic mass poured into the mold.
Figure 6:
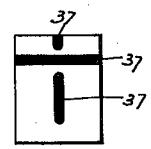
Fig. 6 is a side elevation of the finished button as shown made in Figs. 4 and 5.
Figure 7:
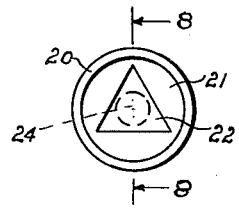
Fig. 7 is a top view of another button.
Figure 8:
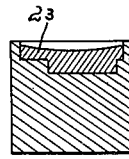
Figs. 8 and 9 are cross-sectional, side views of Fig. 7, taken on line 8—8, and showing various steps in the process.
Figure 9:
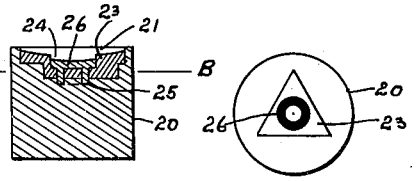

In Figs. 4, 5 and 6, a slight variation in the process has been shown. In this instance, the insignia 31 is depressed right in the face of the button, while various depressions 32, 33 and 34, are formed in the side of the button. The button is inserted in a recess 35 formed in the bottom of a mold 36 and is preferably fitted rather tight in this recess so as to prevent its displacement when the plastic mass 37 is poured in.

After this mass is solidified, the whole unit is removed from the mold. This is facilitated by an opening 38 formed in the bottom of the mold. When this button is trimmed, by machining off all the excess of the plastic mass 37, a button decorated as shown in Fig. 6 will result.

The main thing in this process is to select a plastic body and a plastic material for the insert, which will adhere to each other when thoroughly cured, and to have the recess, or the mold, into which the plastic mass is poured, of sufficient size to provide a "head", which will enable the mass to shrink and still fill up the depressions in which the inserts are held.

From the foregoing it will be seen that by means of this process it is possible to make up a lot of useful as well as ornamental combinations in plastic materials without going to the expense of constructing expensive molds. It is also evident that this process lends itself to articles used for a great many purposes.

Having described the invention and its objects, what I claim as new and wish to protect by Letters Patent is:

1. The process of manufacturing plastic articles which comprises shaping the body of a plastic article to the approximate shape required when finished; forming a relatively deep recess in any desired part of said body; forming a depressed design in the bottom of said recess; filling said recess with a plastic material, in fluid or semi-fluid state, which will adhere to the material of the body; allowing said plastic material to solidify; trimming off the recessed part of the body; and finally finishing the article to the required size and finish.

2. The process of manufacturing plastic articles of contrasting colors which comprises shaping the body of a plastic article to the approximate shape required when finished; forming a relatively deep recess in any desired part of said body; forming a depressed design in the bottom of said recess; filling said recess with a plastic material, of a contrasting color and in fluid or semi-fluid state, which will adhere to the material of the body; allowing said plastic material to solidify; trimming off the recessed part of the body; and finally finishing the article to the required size and finish.

3. The process of manufacturing plastic articles of contrasting colors which comprises shaping the body of a plastic article to the approximate shape required when finished; forming a relatively deep recess in any desired part of said body; forming a depressed design in the bottom of said recess; filling said recess with a plastic material, of a contrasting color and in fluid or semi-fluid state, which will adhere to the material of the body; allowing said plastic material to solidify; forming another relatively deep recess in the solidified material in the first recess; forming another depressed design in the bottom of the last mentioned recess; filling this last recess with a similar plastic material, but of still another color; trimming off the recessed part of the body and finally finishing the article to the required size and finish.

VINCENT FISCHETT.